US010332047B2

(12) United States Patent
Wu et al.

(10) Patent No.: US 10,332,047 B2
(45) Date of Patent: *Jun. 25, 2019

(54) TASK-CENTERED CONTEXT MANAGEMENT

(71) Applicant: ORACLE INTERNATIONAL CORPORATION, Redwood Shores, CA (US)

(72) Inventors: Min Wu, Pleasanton, CA (US); Rami Musa, San Francisco, CA (US); Arin Bhowmick, Fremont, CA (US); Kent Olen Swartz, Leesburg, VA (US)

(73) Assignee: ORACLE INTERNATIONAL CORPORATION, Redwood Shores ( * ) Notice: Subject to any disclaimer, the term of this patent is extended or adjusted under 35 U.S.C. 154(b) by 61 days.

This patent is subject to a terminal disclaimer.

(21) Appl. No.: 15/333,128

(22) Filed: Oct. 24, 2016

(65) Prior Publication Data
US 2017/0046645 A1 Feb. 16, 2017

Related U.S. Application Data

(63) Continuation of application No. 13/628,302, filed on Sep. 27, 2012, now Pat. No. 9,477,945.

(51) Int. Cl.
*G06Q 10/06* (2012.01)
*G06Q 10/10* (2012.01)
(Continued)

(52) U.S. Cl.
CPC ..... *G06Q 10/06311* (2013.01); *G06F 3/0482* (2013.01); *G06F 3/04817* (2013.01);
(Continued)

(58) Field of Classification Search
CPC .............. G06Q 10/06311; G06Q 10/10; G06F 3/04817; G06F 3/0482; G06F 3/1423
See application file for complete search history.

(56) References Cited

U.S. PATENT DOCUMENTS 6,747,970 B1   6/2004 Lamb et al.
7,130,885 B2   10/2006 Chandra et al.
(Continued)

OTHER PUBLICATIONS

Jakob E. Bardram et al., "Support for Activity-Based Computing in a Personal Computing Operating System" CHI 2006 Proceeding, Activity: Design Implications, Apr. 22-27, 2009, Montreal, Quebec, Canada, 10 pages.
(Continued)

*Primary Examiner* — Roland J Casillas
(74) *Attorney, Agent, or Firm* — Vista IP Law Group, LLP

(57) ABSTRACT

A method, system, and computer program product for interaction management systems. The method commences upon receiving a first incoming communication pertaining to a first task, and launching a first task-centered context user interface being initially populated with a first screen device selected in response to the type of incoming communication (e.g., a phone call icon, etc.). An agent interacts with the client by responding to the incoming communication. Then, the method receives a second incoming communication pertaining to the same first task; and populates the first task-centered context user interface with a second screen device appropriate for the second incoming communication (e.g., a chat UI, etc.). Additional new incoming events are routed to its corresponding task-centered context (or a new task-centered context is created). Thus, upon receiving a third incoming communication pertaining to a second task (different from the first task), the method launches a second task-centered context user interface.

21 Claims, 13 Drawing Sheets

(51) Int. Cl.
G06F 3/0481 (2013.01)
G06F 3/0482 (2013.01)
G06F 3/14 (2006.01)
(52) U.S. Cl.
CPC ............. *G06Q 10/06* (2013.01); *G06Q 10/10* (2013.01); *G06F 3/1423* (2013.01)

(56) References Cited

U.S. PATENT DOCUMENTS

| | | | |
|---|---|---|---|
| 9,477,945 | B2 | 10/2016 | Wu et al. |
| 2006/0288107 | A1 | 12/2006 | Klassen et al. |
| 2010/0251119 | A1* | 9/2010 | Geppert ............ G06F 3/04817 715/716 |
| 2012/0045041 | A1 | 2/2012 | Karani et al. |
| 2012/0331404 | A1* | 12/2012 | Buford .................. G06Q 10/10 715/757 |
| 2013/0073995 | A1 | 3/2013 | Piantino et al. |
| 2013/0290879 | A1 | 10/2013 | Greisson |
| 2014/0067401 | A1 | 3/2014 | Sanjeeva et al. |
| 2014/0089822 | A1 | 3/2014 | Wu et al. |

OTHER PUBLICATIONS

Victoria Bellotti et al., "Taking Email to Task: The Design and Evaluation of a Task Management Centered Email Tool", CHI 2003, Apr. 5-10, 2003, Ft. Lauderdale, Florida, USA, ACM, 8 pages.
Victoria Bellotti et al., "What a To-Do: Studies of Task Management Towards the Design of a Personal Task List Manager", CHI 2004, Paper, Apr. 24-29, Vienna, Austria, 8 pages.
Anton N. Dragunov et al., "TaskTracer: A Desktop Environment to Support Multi-taksing Knowledge Workers", IUI'05, Jan. 9-12, 2005, San Diego, California, USA, ACM, 8 pages.
D. Austin Henderson, Jr. et al., "Rooms: The Use of Multiple Virtual Workspaces to Reduce Space Contention in a Window-Based Graphical User Interface", ACM Transactions on Graphics, vol. 5, No. 3, Jul. 1986, pp. 211-243.
William Jones et al., "The Personal Project Planner: Planning to Organize Personal Information", CHI 2008 Proceedings, Knowledge Elicitation, Apr. 5-10, 2008, Florence Italy, 4 pages.
Victor Kaptelinin, "UMEA: Translating Interaction Histories into Project Contexts", Paper: Integrating Tools and Tasks, Ft. Lauderdale, Florida, USA, Apr. 5-10, 2003, 8 pages.
Gerard Oleksik et al., "Lightweight Tagging Expands Information and Activity Management Practices", CHI 2009, Personal Information Management, Apr. 6, 2009, Boston, MA, USA, 10 pages.
George Robertson et al., "The Large-Display User Experience", Applications of Large Displays, IEEE Computer Society, Jul./Aug. 2005, 8 pages.
Jianqiang Shen et al., "Detecting and Correcting User Activity Switches: Algorithms and Interfaces" IUI'09, Feb. 8-11, 2009, Sanibel Island, Florida, USA, 2009 ACM, 9 pages.
Craig Tashman, "WindowScape: A Task Oriented Window Manager" ACM UIST'06, 2006, 4 pages.
Stephen Voida et al., "It Feels Better Than Filing: Everyday Work Experiences in an Activity-Based Computing System", CHI 2009, Personal Information Management, Apr. 6, 2009, Boston, MA, USA, 10 pages.
Stephen Voida et al., "Re-framing the Desktop Interface Around the Activities of Knowledge Work" UIST'08, Oct. 19-22, 2008, Monterey, California, USA, 10 pages.
Steve Whittaker et al., "ContactMap: Organizing Communication in a Social Desktop", ACM Transactions on Computer-Human Interaction, vol. 11, No. 4, Dec. 2004, pp. 445-471.
Non-final Office Action dated Jun. 17, 2014 for related U.S. Appl. No. 13/628,302, 15 pages.
Final Office Action dated Dec. 1, 2014 for related U.S. Appl. No. 13/628,302, 15 pages.
Non-final Office Action dated Jun. 18, 2015 for related U.S. Appl. No. 13/628,302, 15 pages.
Final Office Action dated Jan. 5, 2016 for related U.S. Appl. No. 13/628,302, 18 pages.
Notice of Allowance and Fee(s) due dated Jun. 23, 2016 for related U.S. Appl. No. 13/628,302, 27 pages.

* cited by examiner

TASK-CENTERED CONTEXT MANAGEMENT

CROSS REFERENCE TO RELATED U.S. PATENT APPLICATION

This present application is a continuation of U.S. Pat. Ser. No. 13/628,302 filed on Sep. 27, 2012, entitled "TASK-CENTERED CONTEXT MANAGEMENT," and will issue on Oct. 25, 2016, as U.S. Pat. No. 9,477,945, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of customer relationship management systems and more particularly to techniques for task-centered user interfaces.

BACKGROUND

In customer relationship management (CRM) environments, agents (e.g., sales agents, telemarketing agents, customer service and support agents, etc.) tend to interact with multiple clients simultaneously, either to solve their issues or try to sell them products. For example, market research indicates that agents deal with an average of 2.5 client communications simultaneously. Encouraging agents to multitask through multiple communication channels increases the company's reputation and profitability by improving the throughput of problem resolution (thus making for happy clients). Further, having agents multitask through multiple channels increases the company's operations by needing fewer agents to accomplish the workload, possibly in less time and at a lower cost.

In some CRM systems, each business object (e.g., an email, a problem report, etc.) is usually opened in a separate window or tab opened by the business application corresponding to the business object (e.g., an email reader, a tracking application window, etc.). As a more detailed example, an email reader might open a window corresponding to a particular client's emailed problem report. Or, an issue tracking application might open a window corresponding to a particular client issue report.

Such organization exemplifies a well-known usability problem present in legacy user interfaces (UIs), which problem is often exhibited when users are multitasking: That is, too many windows and/or tabs and/or applications are opened for different purposes, and users too easily lose track of which window or tab corresponds to which task. Often users resort to clicking through all the open windows or tabs to find out which one they should work with next.

Some CRM systems organize business objects into two levels, as follows: A top-level business object serves as a root to group second-level objects that belong together. For example, using such legacy CRM systems, agents can choose to group service requests (SRs) based on their respective associated account. In this example, a given account is shown as a top-level tab, and all of the SRs opened for this account are shown as secondary tabs under this top-level tab. In such an organization, the top-level business objects create a context to group the secondary-level objects that belong to them. In a specific case of the Salesforce Service Cloud Console, agents can group service requests (SRs) based on the associated account. Each account is a top-level tab, and all the SRs opened with this account are secondary tabs under this top-level tab. This two-level-tab approach improves the usability in certain cases but cannot help if multiple tasks that an agent is working on are with the same account, that is, where the business objects from different tasks are again mixed in a single context. The aforementioned two-level tab approach is business-object-centered—not task-centered. Indeed, it is a common occurrence that a single account will have multiple tasks to solve concurrently (e.g., to solve different client issues for the same company), and even the aforementioned two-level-tab approach is still deficient since merely associating multiple SRs to the same common account does not aid the agent to manage the separate events and separate responses that emanate from the separate simultaneously-active service requests.

In some other legacy embodiments, and observing a call-center approach, when an agent launches a phone call to a customer or takes a customer's incoming phone call, a Computer-Telephony Integration application or channel is usually added into a user interface (UI) shell with which the agent is working. A real-time customer phone call forms an entry in the UI shell and creates a context to group together all the business objects that are opened in the agent console during the phone call. In some cases such a UI shell has been extended to accept customer live chats as well, where a customer chat request is added to, or creates a context. As a specific example, an agent might want to engage in simultaneously-active events such as a voice phone call while texting/chatting using a text window. Yet, implementing a UI shell approach alone for amalgamating communications remains communication-centric, not task-centric, and improvements such as are disclosed herein are needed.

A client initiates a live chat with an agent. During the chat session, certain web collaboration tools are used, such as screen sharing or remote control of the client's machine. During the session, the agent realizes that chatting about certain complicated issues is slow and inefficient. The agent dials the client's phone number (e.g., possibly using the user interface of a computer-telephony integration application) in expectation that the phone interaction will improve the collaboration during the chat session. Unfortunately, in this scenario, the chat session and the live phone call are presented in two separate contexts in the UI shell, and the agent has to switch back and forth between these two contexts while engaged on solving the client's problem. In this scenario, the contexts are not task-centered, and the aspect of having to operate separate (and possibly very different) user interfaces in order to service a single client hinders the agent's multitasking performance.

These and other scenarios demand new techniques to bring multiple engagement activities or events under one task-centric console so as to federate those activities. The aforementioned legacy technologies do not facilitate task-centered context management. Therefore, there is a need for improved approaches.

SUMMARY

The present disclosure provides an improved method, system, and computer program product suited to address the aforementioned issues with legacy approaches. More specifically, the present disclosure provides a detailed description of techniques used in methods, systems, and computer program products for task-centered context management.

Exemplary embodiments of the present disclosure automatically create a "context" for amalgamating related incoming events from a single task. Multiple events from a single task can be amalgamated within a single window on a display surface. As new incoming events occur, a context manager either adds them to the current context, or creates a new context for those events if they pertain to a different task. The context manager provides flexible interaction mechanisms to facilitate switching back and forth between different task-centered contexts.

In a system embodiment, operation commences upon receiving a first incoming communication pertaining to a first task, and launching a first task-centered context user interface being initially populated with at least one first screen device selected in response to the first incoming communication (e.g., an incoming email or chat). An agent interacts with the client by responding to the incoming communication. Then, the method receives a second incoming communication pertaining to the same first task and populates the same first task-centered context user interface with a second screen device selected based at least in part on the second incoming communication. This technique keeps the communications that pertain to the same task together in one context.

To further facilitate support of separate contexts for separate tasks, the method can receive additional incoming communications (e.g., pertaining to a second task), whereupon the method launches a second task-centered context user interface responsive to the additional incoming communication. Still further incoming communications or events are routed to the corresponding task-centric context. Various user navigation features are supported to ease navigation between tasks.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
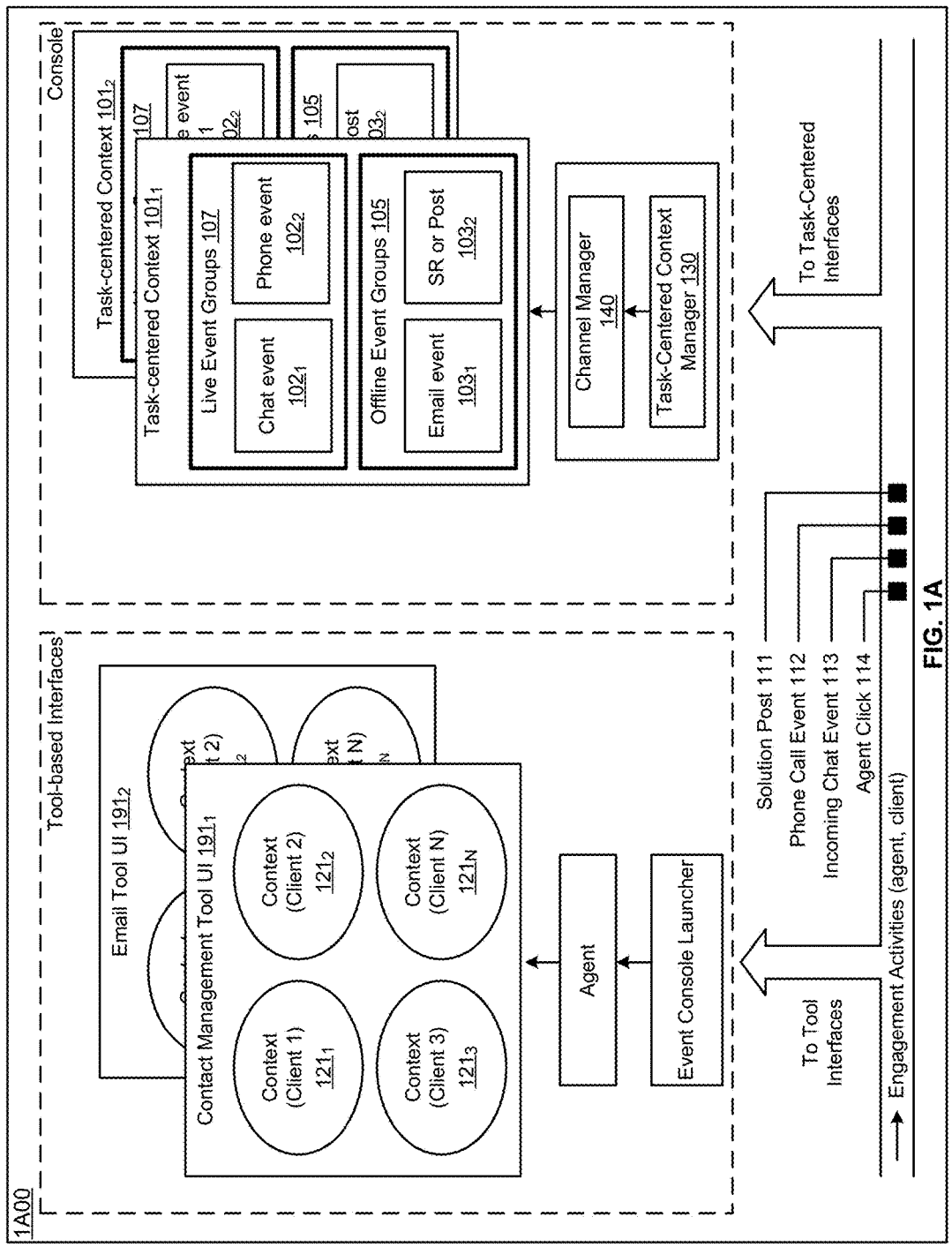
FIG. 1A is an environment showing routing of engagement events, according to some embodiments.

Some embodiments of the present disclosure are directed to an improved approach for customer relationship management (CRM) environments. More particularly, disclosed herein are environments, methods, and systems for implementing task-centered context management.

Overview

In the customer relationship management (CRM) environment, agents (including sales agents, telemarketing agents, and customer service and support agents) tend to interact with multiple clients simultaneously. Moreover in customer relationship management environments, agents tend to interact with a given single client using multiple interaction channels simultaneously. For example an agent might interact with a client via a voice phone call while simultaneously engaging in an email exchange and/or while simultaneously engaging in a chat session.

Herein are disclosed techniques to aid the agent in automatically establishing a user interface context that subsumes multiple interaction channels simultaneously. The techniques disclosed herein provide ease of navigation and task-switching while servicing a particular client and/or while moving between activities for servicing one client and activities for servicing another different client.

Strictly as an example, in a modern CRM environment, when an agent launches a phone call to a client or takes a client's incoming phone call, a computer-telephony integration application interacts with the agent via a user interface. Such a UI can be provided as a desktop-based or web-based CRM application with which the agent is working, and such a UI can show the existence of the phone call as an icon. Continuing this example, an incoming real-time client phone call forms an entry in the UI and generates a task-centered context that serves to group together all of the business objects (e.g., SRs) that are opened by the agent console during the course of the phone call, and related to the current task. As is discussed in detail below, such a UI can support adding-in client live chat UI devices and can support other task-centered engagements as well. Alternatively, a properly-routed incoming client chat request can itself generate a task-centered context (see "task centered context manager" and see "channel manager" and related disclosure, below).

Indeed, with multi-channel or cross-channel communications becoming more common, an agent may choose to instantiate multiple concurrent communications sessions for interacting with a client, for example, by using different communication channels, such as phone calls, email, social media, and web portals. In addition to the aforementioned task-centered contexts that serve to group together all the task-related activities, an activity stream or conversation model is disclosed herein to provide a single coherent client history across these channels. Moreover, if a particular client (for which client a task-centered context has been opened) is further connected through a second or Nth real-time interaction simultaneously, the UI shell groups those interactions from different channels within the same context. Further features and scenarios are supported, and are disclosed in detail herein and in the following figures.

Definitions

Some of the terms used in this description are defined below for easy reference. The presented terms and their respective definitions are not rigidly restricted to these definitions—a term may be further defined by the term's use in this disclosure.

The term "task" refers to a collection of one or more activities involved in achieving a goal state of a problem or an issue and/or refers to a selling or marketing objective.

The term "context" is the virtual space where all the supporting screen devices are grouped together to ease navigation while pursuing a goal state of a specific task.

The term "task event" refers to an incoming phone call event, an incoming chat event, an agent click, or other event resulting directly or indirectly from an incoming communication.

The term "screen device" refers to user interface surfaces, windows or screen widgets.

The term "console" refers to a top-level window comprising multiple contexts corresponding to different tasks.

The term "dashboard" refers to a virtual space that is separate from a context and from which a new context can be created from user actions (e.g., open an SR or dial out). The dashboard can serve as a default interface when the user signs in (e.g., in situations when there is no context in existence).

The term "logic" means any combination of software or hardware that is used to implement all or part of the embodiments of the present disclosure.

A "module" includes any mix of any portions of computer memory and any extent of logic or other circuitry including circuitry embodied as a processor.

Reference is now made in detail to certain embodiments. The disclosed embodiments are not intended to be limiting of the claims.

DESCRIPTIONS OF EXEMPLARY EMBODIMENTS

FIG. 1A is an environment 1A00 showing routing of engagement events. As an option, the present environment 1A00 may be implemented in the context of the architecture and functionality of the embodiments described herein. Also, the environment 1A00 or any aspect therein may be implemented in any desired environment.

The disclosure herein includes user interfaces (UIs) in various forms of a task-centered context to facilitate agent interaction with multiple clients while managing multiple tasks, each task with its own context. In some embodiments, a task-centered context manager includes a navigation bar (e.g., a global toolbar at the top of the various screens). Each context can be represented as an entry in the toolbar (e.g., an icon, a text block, etc.). Various screen devices are populated by a task-centered context manager in order to group task-specific events (e.g., possibly in the form of windows and tabs) that belong to a particular context and thus the separate task-centered contexts serve to group one set of task-specific events from events that belong to different tasks.

The diagram of FIG. 1A gives a schematic representation of user interfaces (UIs) in various forms. The representations of the business object tools user interfaces (e.g., contact management tool UI $191_1$, email tool UI $191_2$) show that multiple contexts (e.g., context $121_1$, context $121_2$, context $121_3$, context $121_N$, etc.) are subsumed within respective business object tools and user interfaces, as shown. While this amalgamation is prevalent in legacy systems, the herein-disclosed embodiments of task-centered contexts (e.g., task-centered context $101_1$, task-centered context $101_2$, etc.) serve to facilitate agent interaction with a client while managing multiple events within that context. In embodiments of systems for task-centered context management, the aforementioned business object tools together with their respective user interfaces may coexist with task-centered contexts.

In some embodiments, task-centered contexts are launched and managed by a task-centered context manager 130. Management of a task-centered context may also include management of multiple communication channels. Accordingly a channel manager 140 is provided to facilitate display and coordination of activities between multiple communication channels. The foregoing activities can comprise a phone call event 112, an incoming chat event 113, a problem or solution post event 111, an event in the form of an agent click 114, and/or other events and activities discussed herein.

Shown in FIG. 1A are representations of multiple events (e.g., event $102_1$, event $102_2$, event $103_1$, and event $103_2$). Such events can be categorized as live events and offline events.

In the environment in which CRM agents perform, it happens frequently that an agent will be concurrently processing both of the above two types of events (live events and offline events). As examples, real-time interaction settings include such live events (phone conversations, chat conversations, etc.) which involve real-time, low-latency communication with clients. Offline events, on the other hand, are defined as events where agents and client do not have an expectation to communicate real-time, or with low latency. Examples of such offline events include email, web-site posts, and/or social media posts.

When engaging a client (e.g., approaching an issue resolution, selling a product or service, etc.), a typical agent might process several tasks concurrently, and may have live and/or offline events pending (or both) at any moment in time. For example, when a client calls in about a certain product issue, an agent might handle the phone call within a real-time interaction setting (e.g., phone conversation, other live task, etc.). If the agent realizes that the issue or engagement cannot be immediately concluded (e.g., the issue is complicated, or further research is needed), then the agent might ask the client to hang up for the moment and await further instructions. In this scenario, the agent indicates a call back when the solution is in hand. The agent generates or updates a service request, and when the call is terminated (e.g., when the agent begins searching for solutions), the live event goes into an offline state. When the agent finds the solution and calls the client back to advise the client of the solution, the event becomes live again.

Accordingly, and as shown, a given task-centered context supports separate amalgamation or grouping of two types of events. Offline event groups 105 are generated for offline events, while in interactive settings, live event groups 107 are generated for real-time events. Depending on the number of real-time communication channels involved in a real-time interaction setting that are being handled simultaneously (e.g., live task, phone conversation, etc.), real-time interaction settings can be further characterized either as single-channel real-time interactions or as multichannel real-time interactions.

External Actions Automatically Generate a New Task-centered Context

Following the techniques exemplified and discussed in FIG. 1A, a computer implemented method for task-centered context management can be configured to receive an event indication (e.g., an incoming phone call event, an incoming chat event, an agent click, etc.) from a first source (e.g., a tool interface such as a contact management tool UI $191_1$, email tool UI $191_2$), and create a task-centered context indication in the console UI In exemplary cases, the task-centered interface is initially populated with a representation of one or more screen device indications (e.g., an event icon, a display area, a screen device or display widget, etc.), which screen device indications are responsive to, and/or are selected based at least in part on the received event type. Further, following the task-centric model, the computer implemented method serves to receive additional event indications from within the task-centered interface, which in turn populates the task-centered interface with a screen device selected based at least in part on the additional event indication.

Thus, new task-centered contexts are automatically generated by an agent's out-of-context actions. As can be seen, agents do not have to spend extra effort to explicitly or manually create a task-centered context in order to use it. The aforementioned task-centered interface can be embodied as a window-based screen device or as a console user interface, which embodiments are described infra.

Figure 1B:
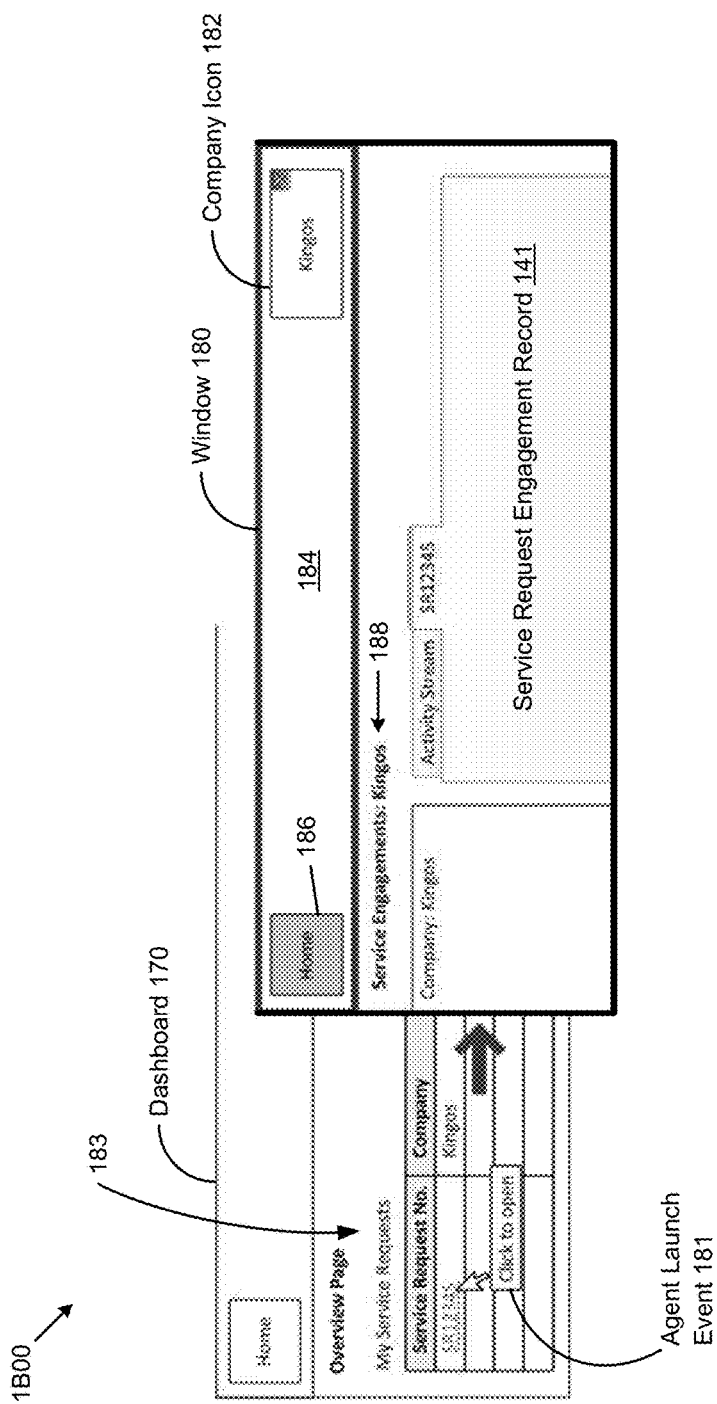
FIG. 1B is a depiction of an auto-generated task-centered context in the form of a window screen device launched from an out-of-context tool, according to some embodiments.

FIG. 1B is a depiction 1B00 of an auto-generated task-centered context in the form of a window screen device launched from an out-of-context tool. As an option, the depiction 1B00 may be implemented in the context of the architecture and functionality of the embodiments described herein. Also, the depiction 1B00 or any aspect therein may be implemented in any desired environment.

CRM tools often use a "control panel" in conjunction with various types of queue managers to contain and present overview pages which in turn may contain lists or queues of service requests, prospects, emails, and social media messages, etc. that are assigned to a particular agent. As shown in FIG. 1B, opening an item from such a dashboard 170 indicates that an agent intends to start a new activity (e.g., sales activity, customer support activity, etc.) corresponding to the opened item, and thus, in this case, a new task-centered context is generated.

As shown, the new task-centered context is embodied as a window 180, a navigation bar (e.g., global toolbar 184) displayed at the top of the various screens, and a label 188. Each task-centered context can be represented as an entry in the navigation bar (e.g., an icon 182, a text block, etc.). Various screen devices (e.g., a window, a toolbar, etc.) can be used in a task-centered context manager to group widgets that pertain to a particular (first) context and thus serves to separate that group of widgets from the different set of widgets pertaining to (second, or Nth) different tasks. Some embodiments of window 180 include a tab or tabs for a service request engagement record 141. Further, some embodiments include a home button 186 within the window 180 (e.g., within an instance of a global toolbar 184).

The specific example of FIG. 1B depicts an offline auto-generated task-centered context as a result of the generating event (e.g., agent launch event 181) being an event that originates from a tool deemed to be a non-real-time tool (e.g., see My Service Requests 183 in dashboard 170). In addition to the offline context as shown and described in FIG. 1B a new live context can be generated based on an event indication from an interactive or real-time event-specific tool such as an integrated computer telephony application (see FIG. 2).

Figure 2:
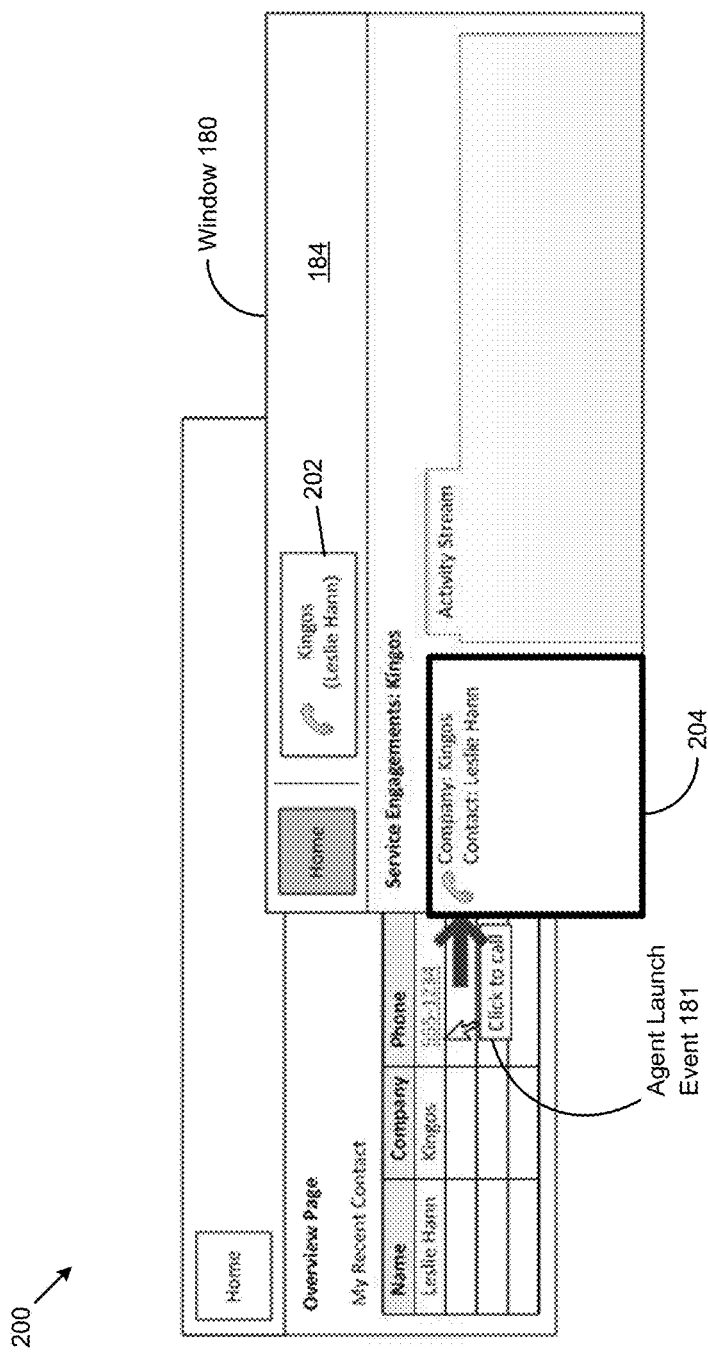
FIG. 2 is a context launch sequence including a real-time interactive area used within systems for task-centered context management, according to some embodiments.

FIG. 2 is a context launch sequence 200 including a real-time interactive area used within systems for task-centered context management. As an option, the present context launch sequence 200 may be implemented in the context of the architecture and functionality of the embodiments described herein. Also, the context launch sequence 200 or any aspect therein may be implemented in any desired environment.

As shown in FIG. 2, dialing a client or prospect from outside of any task-centered context (e.g., from dashboard 170) generates a real-time interaction setting. The automatic creation of a task-centered context includes population of a task-centered context with UI screen devices so as to ensure that it is easy to perform a particular task, and/or to open a related item, and/or to contact a related client from within the newly-generated context. Thus, it is deemed unlikely for an agent to go out of a task-centered context (e.g., to a legacy task-centric tool) in order to open an item or contact a client rather than from within the newly-generated context.

In exemplary embodiments, when an agent initiates a phone call event 112 (e.g., from within a dashboard), such a live event indication is considered to be an out-of-context event, and a new entry 202 is displayed in the navigation bar (e.g., global toolbar 184). While the communication channel is being established (e.g., while the phone is ringing), a new real-time interaction setting 204 is formed having a single communication channel.

Figure 3:
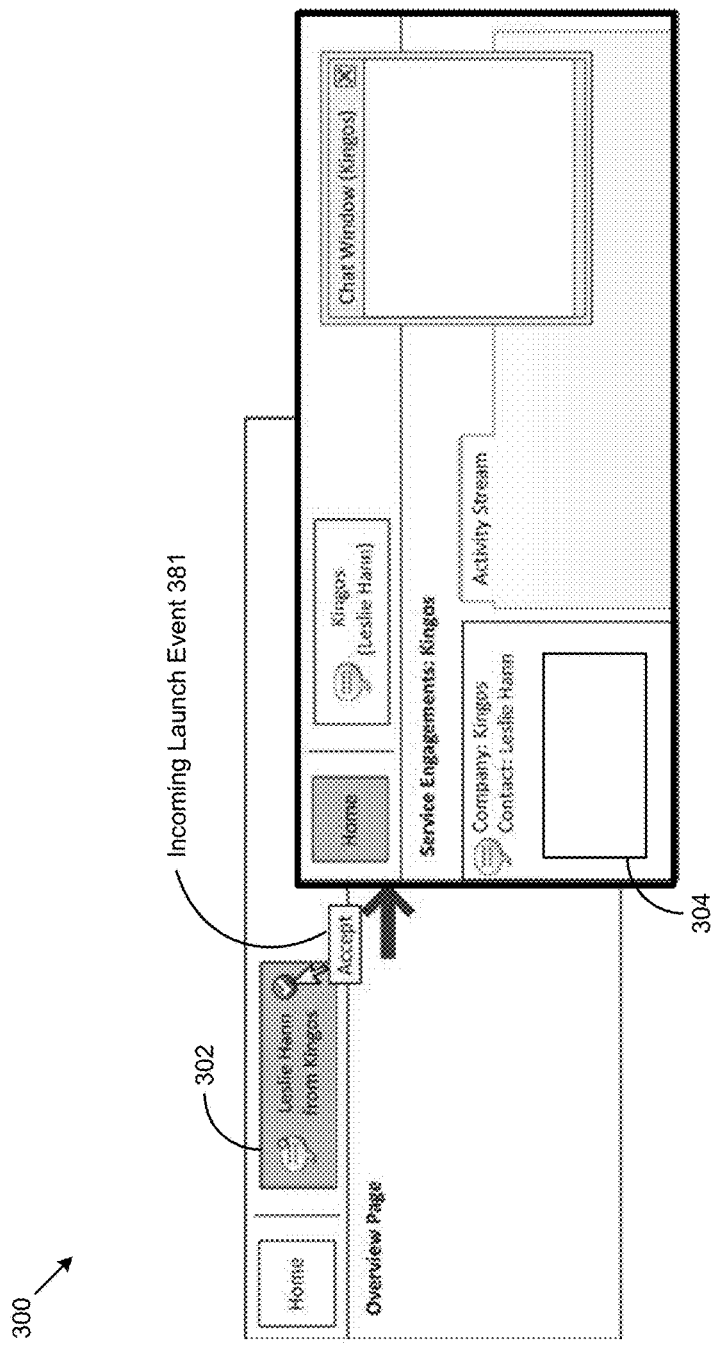
FIG. 3 is an auto-generated task-centered context in the form of a window screen device generated by an interactive launch event from within a system for task-centered context management, according to some embodiments.

FIG. 3 is an auto-generated task-centered context in the form of a window screen device 300 generated by an interactive launch event from within a system for task-centered context management. As an option, the present window screen device 300 may be implemented in the context of the architecture and functionality of the embodiments described herein. Also, the window screen device 300 or any aspect therein may be implemented in any desired environment.

FIG. 3 shows one technique for how a new context is generated when a live chat request is accepted. In exemplary embodiments, when an incoming live chat event is routed to an agent, such a live request is considered to be an independent event, and a new chat entry 302 is displayed in the navigation bar. If the agent accepts the incoming request, thus creating an incoming launch event 381, a new instance of a real-time interaction setting 304 is formed having a single communication channel. If the agent rejects the incoming request (or the request times-out), the new chat entry 302 disappears from the toolbar and no new instance of the real-time interaction setting 304 is generated.

Figure 4:
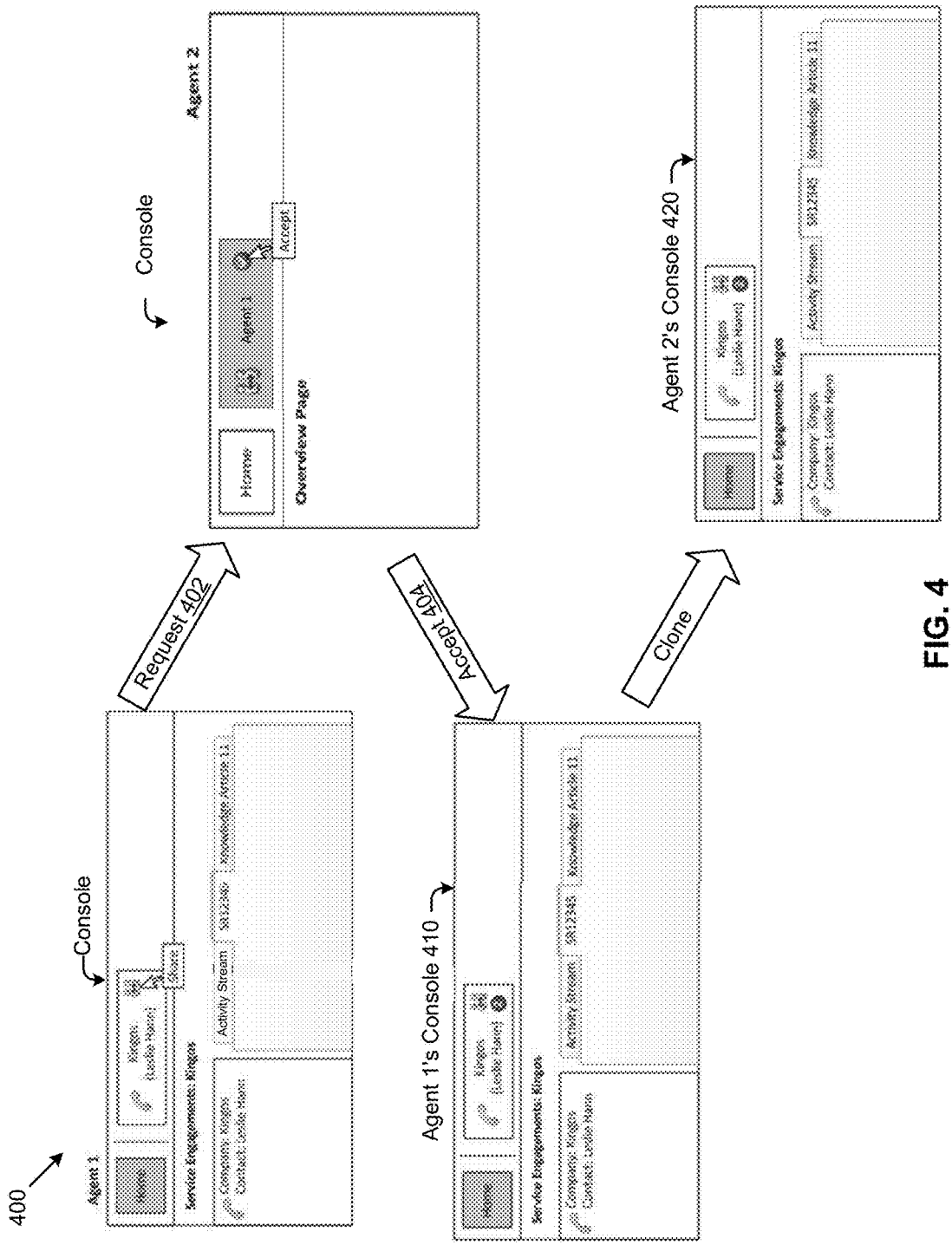
FIG. 4 shows a multi-agent console population sequence used within a system for task-centered context management, according to some embodiments.

FIG. 4 shows a multi-agent console population sequence 400 used within a system for task-centered context management. As an option, the present multi-agent console population sequence 400 may be implemented in the context of the architecture and functionality of the embodiments described herein. Also, the multi-agent console population sequence 400 or any aspect therein may be implemented in any desired environment.

Embodiments discussed herein support agent collaboration. An inter-agent collaboration can be opened when a first agent determines that he or she cannot handle a certain task alone. Then, the first agent either invites other helping agents to join the task context for purposes of collaboration, or the agent can transfer the engagement with its context to another agent. Such collaboration by invitation or transfer of the engagement appears as a new entry in the navigation bar (e.g., global toolbar 184) in the window(s) of the respective agent(s). When a helping agent accepts the invitation or transfer, the context from the requesting agent is cloned in the helping agent's console as a new context.

FIG. 4 illustrates how a task-centered context is cloned into a second agent's console (e.g., agent 2's console 420) after a first agent (e.g., agent 1) shares the subject context from agent 1's console 410. As shown, agent 1 sends an invitation or transfer request via request path 402, and agent 2 rejects the request or accepts via accept path 404, as shown. In the event of an acceptance by agent 2, then components of agent 1's console 410 are cloned into agent 2's console 420.

Figure 5:
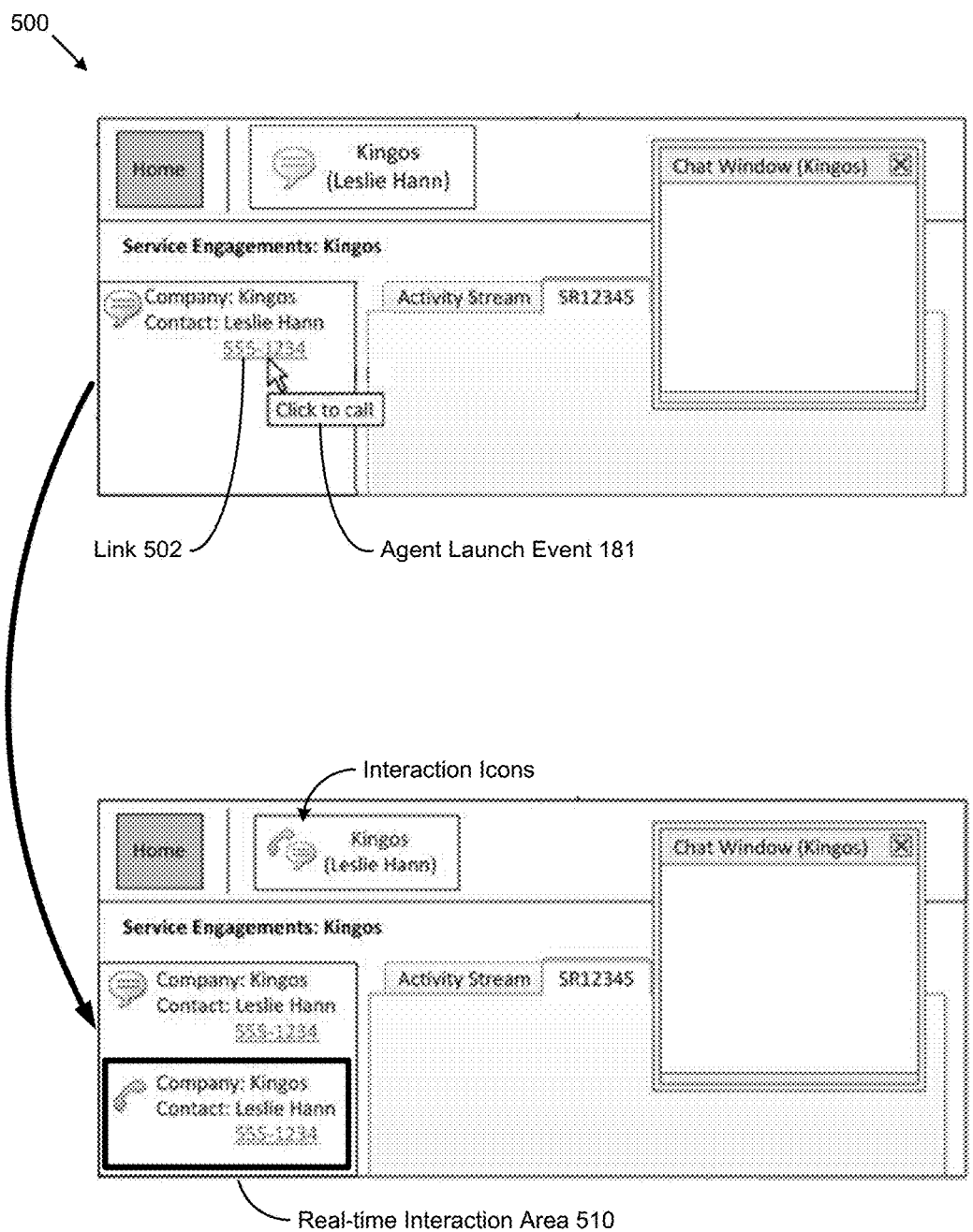
FIG. 5 shows a console population sequence including a real-time interaction area used within a system for task-centered context management, according to some embodiments.

FIG. 5 shows a console population sequence 500 including a real-time interaction area used within a system for task-centered context management. As an option, the present console population sequence 500 may be implemented in the context of the architecture and functionality of the embodiments described herein. Also, the console population sequence 500 or any aspect therein may be implemented in any desired environment.

As shown, an agent's in-context actions keep the agent in the current context. For example, when a task-centered context has been generated for a particular task, any action performed by an agent within this context is considered related to the current task-centered context and thus agent actions from within the task-centered context keep the agent in the context. In some embodiments, when an agent is opening a business object, it can be opened as a secondary-level tab in the task-centered context or a separate child window belonging to that task-centered context. As another example, when an agent is launching a second real-time communication (for example, dialing out to a client), the communication channel and the associated screen devices (such as a chat window or as a real-time interaction setting 304, etc.) are deemed to belong to the current context. In such a case, the channel manager 140 will group the first and second communications (e.g., chat and phone) within the current context, which will be recast to a multichannel real-time communication context (e.g., as may be indicated by the appearance of an updated icon in the corresponding context). The shown console includes a link 502, which link can be clicked by an agent, which in turn precipitates an agent launch event 181 which in turn populates a real-time interaction area 510.

Figure 6A:
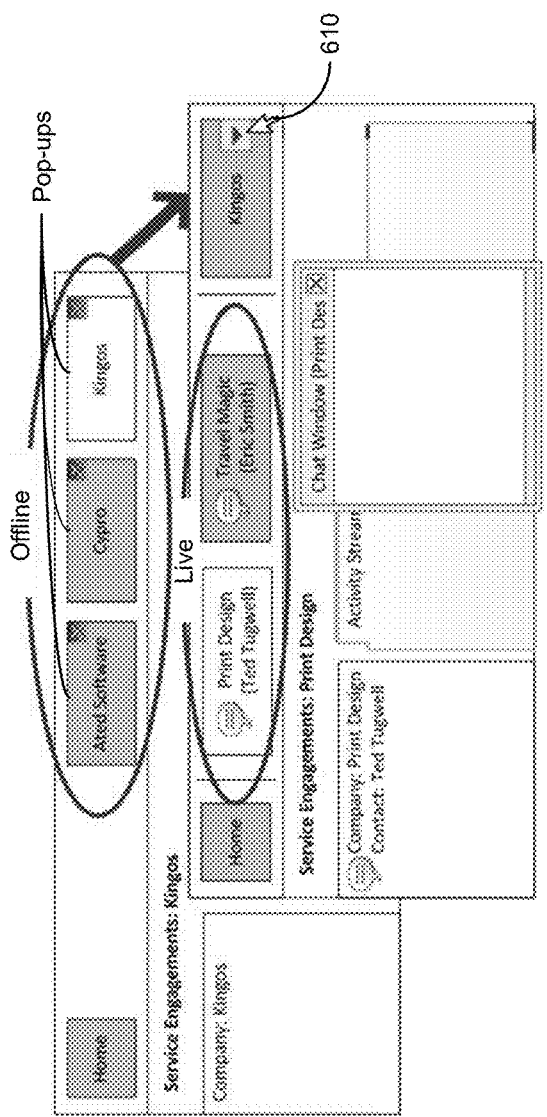
FIG. 6A shows a console display sequence using priority-based context coalescing as used within a system for task-centered context management, according to some embodiments.

FIG. 6A shows a console display sequence 6A00 using priority-based context coalescing as used within a system for task-centered context management. As an option, the present console display sequence 6A00 may be implemented in the context of the architecture and functionality of the embodiments described herein. Also, the console display sequence 6A00 or any aspect therein may be implemented in any desired environment.

In the shown sequence, a priority-driven regime encodes context priorities, which in turn determines the relative placements of their icons/entries in the navigation bar. More specifically and strictly as an example, real-time activities are considered more urgent and thus have higher priority than offline activities. The priority-driven UI supports other mechanisms of priority assignment. For example, requests and/or events from high-value customers may have a higher priority than those from other customers. In the navigation bar, the context priority is encoded, which in turn affects relative placement. In this embodiment, the real-time interaction activities with a higher priority start from the left side of the toolbar, while the offline, lower priority activities are placed farther to the right of the navigation bar.

In another embodiment, more screen real estate in the toolbar is dedicated to higher-priority interactions. In some situations it is possible that both high-priority and the low-priority contexts exist at the same time and thus might compete for toolbar space. In such a situation, low-priority contexts can be coalesced and can shrink into a single drop-down list, making room for high-priority contexts (see FIG. 6B). Strictly as an example, switching to a high-priority context can be accomplished with a single click, while switching to a low-priority context may require two clicks. Following this latter low-priority example, the first click opens the drop-down list 610, while the second click switches the context. Such a priority-driven UI helps agents focus on more important or urgent tasks.

Figure 6B:
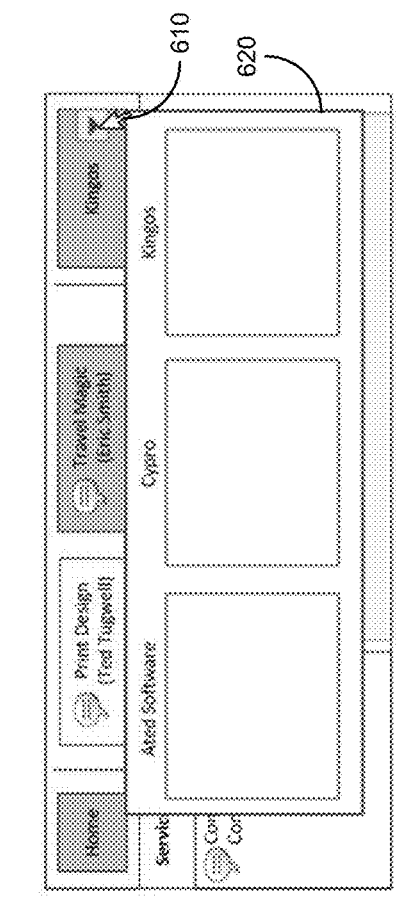
FIG. 6B shows a console display sequence using context selection as used within a system for task-centered context management, according to some embodiments.

FIG. 6B shows a console display sequence 6B00 using context selection as used within a system for task-centered context management. As an option, the present console display sequence 6B00 may be implemented in the context of the architecture and functionality of the embodiments described herein. Also, the console display sequence 6B00 or any aspect therein may be implemented in any desired environment.

As indicated above, it is possible that low-priority contexts can be coalesced and can shrink into a single drop-down list, making room for high-priority contexts. However, such coalesced contexts might increase in priority (e.g., due to an incoming event), or the agent might merely wish to take some action in one of the coalesced contexts. In such a case, the drop-down list 610 can be accessed to reveal a pop-up device 620 from which pop-up device one of the coalesced contexts can be selected.

Figure 7:
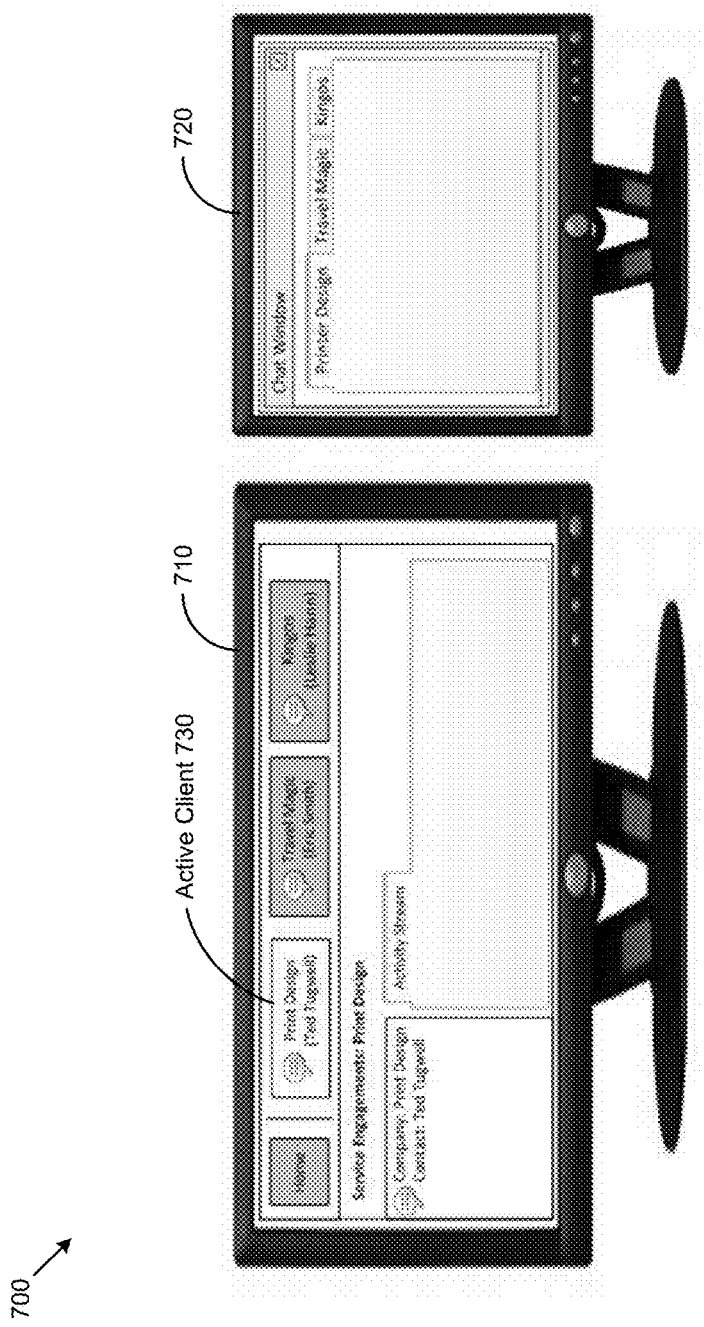
FIG. 7 shows a multi-terminal environment having two display surfaces as used within a system for task-centered context management, according to some embodiments.

FIG. 7 shows a multi-terminal environment 700 having two display surfaces as used within a system for task-centered context management. As an option, the present multi-terminal environment 700 may be implemented in the context of the architecture and functionality of the embodiments described herein. Also, the multi-terminal environment 700 or any aspect therein may be implemented in any desired environment.

In the foregoing embodiments, child screen devices (e.g., in the form of child windows, or child panels, or child tabs) support convenient navigation between different tasks or between activities in different contexts (aka, context switching). Embodiments disclosed here also support convenient navigation between tasks or activities within a particular context. In some cases, additional screen real-estate allows for convenient navigation between events or activities within particular contexts, and second or third monitors satisfy the provision of additional screen real-estate.

As shown, a first monitor 710 displays a console, while a second monitor 720 displays a chat window from the same task-centered context. Following this model, context switching is very flexible. For example, clicking a toolbar entry (e.g., to activate an active client 730) brings the associated context in focus, which activation updates the content below the toolbar in the console and also brings to the front all child windows in that context. Then, clicking any child window of a task-centered context also brings that context in focus. Child windows can be dragged to a second monitor, thus agents can switch contexts without being required to go back to the navigation bar (e.g., global toolbar 184) in the main monitor. For example, in a mouse/cursor pointing system, agents do not have to move the cursor to the first monitor to switch contexts when they are working with the second monitor; they can switch contexts directly using the screen devices of the second monitor.

In still other embodiments, an agent can merge the same type of child windows from different contexts into a single window to avoid too many child windows. For example, as shown in FIG. 7, when an agent is chatting with three clients, instead of opening three chat windows, the agent can choose to put the three chat sessions into a single window, where each chat is represented as a tab. Switching chat tabs in the window in the second monitor also switches the contexts.

Context-Driven Channel Switching Automatically Activates or Pauses the Corresponding Communications If multiple contexts share an exclusive communication channel, for example, a phone line that enables only one active conversation at a time, switching contexts automatically activates the communication in the in-focus context and pauses the communications in other background contexts. When an agent talks to two clients on the phone within two contexts simultaneously, if context A is in focus, the agent's phone call with client A is on-hook, and her phone call in context B is on-hold; if she switches to context B, the phone call in context B automatically resumes and the phone call in context A is automatically put into an on-hold state. This context-driven channel switching frees the agents from manually manipulating the phone line during context switching when they are talking to multiple clients simultaneously, and can be easily extended to other exclusive multimedia channels, such as video chat.

Figure 8A:
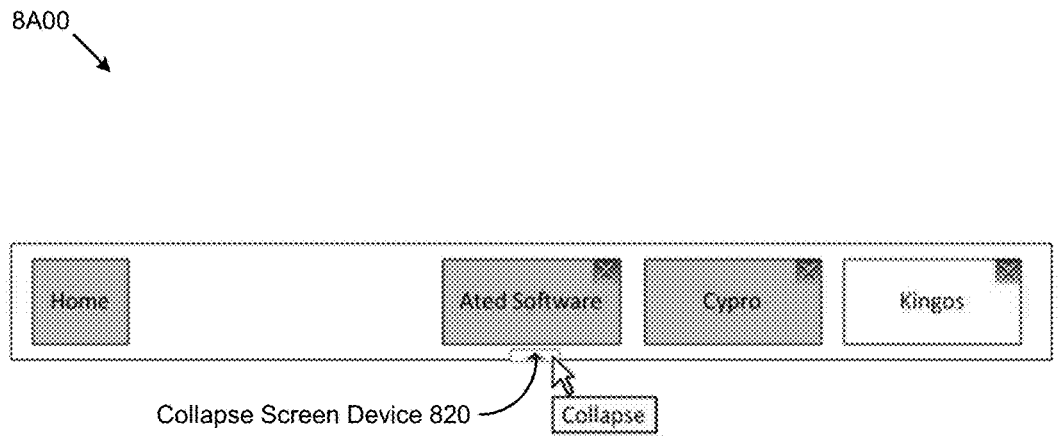
FIG. 8A shows a collapsible toolbar as used within a system for task-centered context management, according to some embodiments.

FIG. 8A shows a collapsible toolbar 8A00 as used within a system for task-centered context management. As an option, the present collapsible toolbar 8A00 may be implemented in the context of the architecture and functionality of the embodiments described herein. Also, the collapsible toolbar 8A00 or any aspect therein may be implemented in any desired environment.

On demand, the navigation bar (e.g., global toolbar 184) can be collapsed to mini-mode using a collapse screen device 820. A collapsed navigation bar frees-up screen real estate for other purposes. This expand/collapse can facilitate a working model for agents who do not usually receive real-time communication except for emergency situations.

Figure 8B:
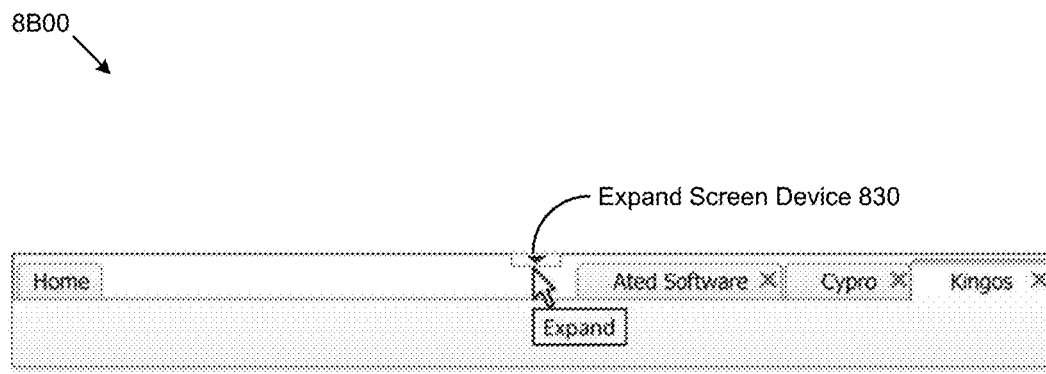
FIG. 8B shows an expandable toolbar as used within a system for task-centered context management, according to some embodiments.

FIG. 8B shows an expandable toolbar 8B00 as used within a system for task-centered context management. As an option, the present expandable toolbar 8B00 may be implemented in the context of the architecture and functionality of the embodiments described herein. Also, the expandable toolbar 8B00 or any aspect therein may be implemented in any desired environment.

A navigation bar that has been collapsed to mini-mode, can be un-collapsed using an expand screen device 830.

Figure 9A:
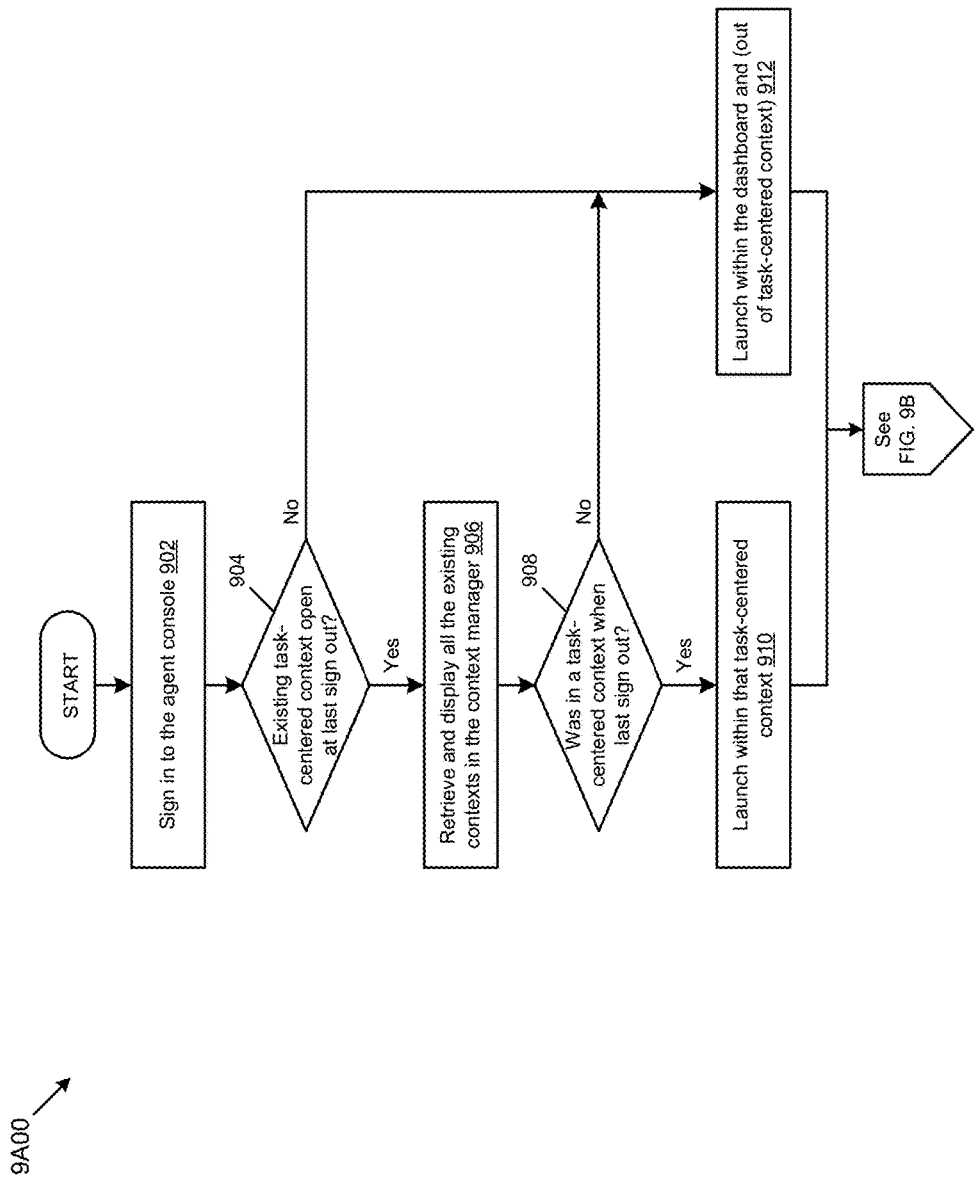
FIG. 9A shows a sign-in procedure for an agent to sign-in to a system for task-centered context management, according to some embodiments.

FIG. 9A shows a sign-in procedure 9A00 for an agent to sign-in to a system for task-centered context management. As an option, the present sign-in procedure 9A00 may be implemented in the context of the architecture and functionality of the embodiments described herein. Also, the sign-in procedure 9A00 or any aspect therein may be implemented in any desired environment.

The sign-in procedure commences when an agent signs in to the agent console (see operation 902). If the agent had been interacting with task-centered contexts at the point of the last logout (see decision 904), then the UI displays the existing contexts in the context manager (see operation 906). Further, if agent had been interacting with specific chats or other settings within the task-centered contexts at the point of the last logout (see decision 908), then the system launches a UI display with the corresponding chats or other settings within the task-centered context (see operation 910). If the agent had not had active task-centered activities at the point of the last logout, then the system will launch a new context within the dashboard (see operation 912), and the agent's console is deemed ready for launching screen devices for agent interaction or for launching screen devices for servicing incoming events.

Figure 9B:
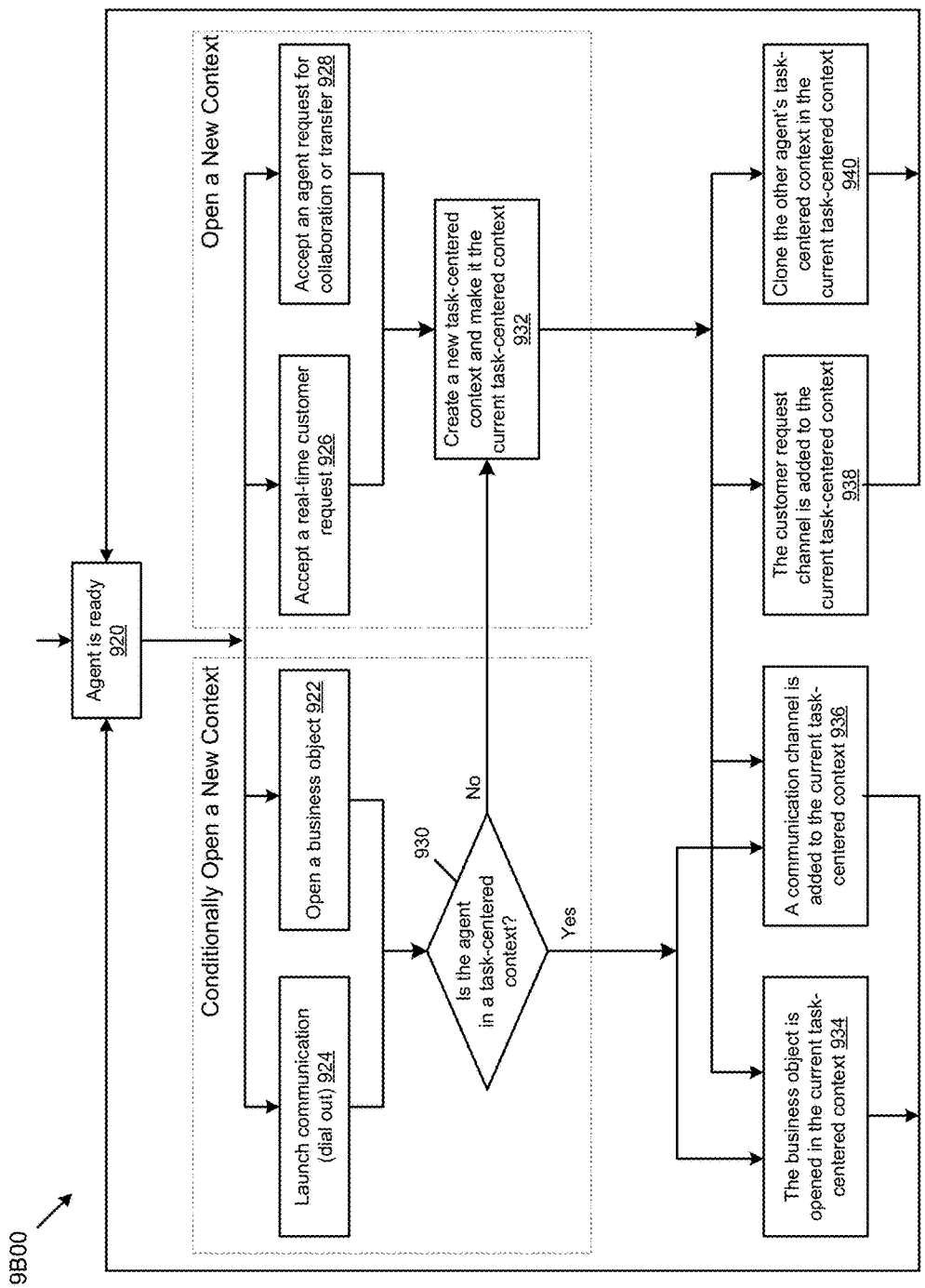
FIG. 9B shows a launch procedure for an agent to launch a system for task-centered context management, according to some embodiments.

FIG. 9B shows a launch procedure 9B00 for an agent to launch a system for task-centered context management. As an option, the present launch procedure 9B00 may be implemented in the context of the architecture and functionality of the embodiments described herein. Also, the launch procedure 9B00 or any aspect therein may be implemented in any desired environment.

Continuing the sign-in procedure introduced in the discussion of FIG. 9A, once signed-in, the system is able to respond to events, and is able to generate screen devices which screen devices correspond respectively to the type of event. For example, once the agent is ready and signed-in (see state 920), the system can launch a dial-out communication interface (see operation 924), or is able to open a business object such as an SR (see operation 922), or is able to accept a real-time customer request (see operation 926), or accept an agent request for collaboration or transfer (see operation 928). In the situation that the agent initiates the action (see operation 924 and operation 922) the system determines if the agent is already in a task-centered context (see decision 930), and if not, a new task-centered context is created (see operation 932). At this point, the system is able to respond to any of a wide variety of events.

Strictly as a further example, in the situation where the agent initiates the action (see operation 924 and operation 922) the system determines if the agent is already within a task-centered context, and if so (see decision 930), the system can open a business object such as an SR in the current task-centered context (see operation 934), or the system can add a communication channel to the current task-centered context (see operation 936). Alternatively, if the system determines that a new task-centered context is needed to be created (see decision 930), then a new task-centered context is created, and it becomes the current task-centered context (see operation 932).

Again, strictly as an example, in the event of an incoming real-time customer request such as a real-time customer request (see operation 926), or such as an agent request for collaboration or transfer (see operation 928) a new task-centered context is created, and that context becomes the current context. Further, the system can still respond to any form of an incoming customer request (see operation 938), or the system can clone aspects of a second agent's task-centered context into a first agent's task-centered context (see operation 940).

Additional Embodiments

Other Features

Context deletion: Context deletion takes minimal effort from the agents. An offline context has a close button in its navigation bar (e.g., global toolbar 184) entry. Because the navigation bar entries act as top-level tabs, deleting an offline context is as simple as closing a tab.

Auto-termination of real-time interaction settings: A real-time interaction setting ends when its last live communication is terminated. If a live context was generated by an agent dialing a client or accepting a live communication request from a client, terminating all live channel(s) automatically deletes the context. On the other hand, if the live context was escalated from an offline context by the agent launching a live communication, terminating all live channel(s) downgrades the context back to the offline mode.

Manual overrides of contexts: By default, a new context is generated when a business object is open out of any context, while a business object opened within a task-centered context stays in that context. Agents can manually override this behavior. Dragging a business object (e.g., from a tool-based interface) and dropping it to a task-centered context entry in the navigation bar (e.g., global toolbar 184) opens it in the dropped context. Right-clicking a business object within a task-centered context shows an option to open the object in a new context.

Merging contexts: Dragging a task-centered context entry in the navigation bar (e.g., global toolbar 184) and dropping it to another context entry merges the two contexts. All the opened business objects remain open in the new context. Real-time communication channels are collected within the next context. Agents can have the option to further merge multiple chat sessions into a group chat, or multiple phone calls into a teleconference (e.g., in the case that they are talking about the same issue).

Exemplary Use Models, Characteristics, and UI Techniques

Contexts are automatically generated, each for a separate task, without extra effort from agents. A single click of the context tab brings forward all the related business objects for the current task and pushes backward other unrelated ones. Agents need not click through all the open windows or tabs to see which one belongs to the current task and thus bring it to the front.

Task-centered contexts better match the mental model of an agent who is multitasking, and needs to perform activities in a seamless cross-channel environment between a client and an agent. A client can be reached by phone and by chat simultaneously in a single context. Related live communications need not be handled using separate tools having separate tool-based interfaces.

Priority-driven UI helps agents to correctly identify more important events and then focus on responses to those more important events by making their contexts easier to access than the less important ones.

Multiple monitor support provides a flexible context switching mechanism for agents to easily go back and forth between tasks, even across multiple monitors.

Context-driven channel switching relieves agents from the error-prone activities of manually managing different concurrent phone calls during the context switching.

Agent sharing and agent transfer: When an agent has a real-time communication with a client, the agent can ask other agents to join the channel to help solve the client's issue. Enabling context sharing is straightforward, efficient, and complete. By clicking certain of the interaction icons (e.g., share icon button) in the navigation bar the agent can share all the business objects that have been opened within the context, as well as all the associated communication channels.

Supervisor monitoring: A supervisor can monitor or join the real-time communication channels between an agent and a client. Some embodiments bring the supervisor into context during the supervision, so that the supervisor can have complete oversight. Moreover, with a task-centered context involving multiple channels, the supervisor does not have to join multiple times, one for each channel.

The task-centered context manager can be extended to enterprise collaboration. The task-centered context manager cooperates with collaborative task management ools. For example, each task can be associated with a task-centered context via a virtual collaboration space established for the task assignees. Other collaboration tools can be used independently in each task's virtual space, keeping the statuses in context. Clicking a task in the task list brings its context into focus and its associated windows to the foreground. The shared context can be configured to be transparent.

Web browser implementations: Certain web browser features help users better organize browser tabs by enabling them to group related tabs and to switch between groups. Extending a group concept into context can lead to a better user experience, where each context not only groups the related browser tabs but also has its own bookmarks, browser add-ons, and even configurations. Contexts are then truly self-contained virtual spaces that improve the user's multitasking performance in the browser environment.

Additional Embodiments of the Disclosure

Figure 10:
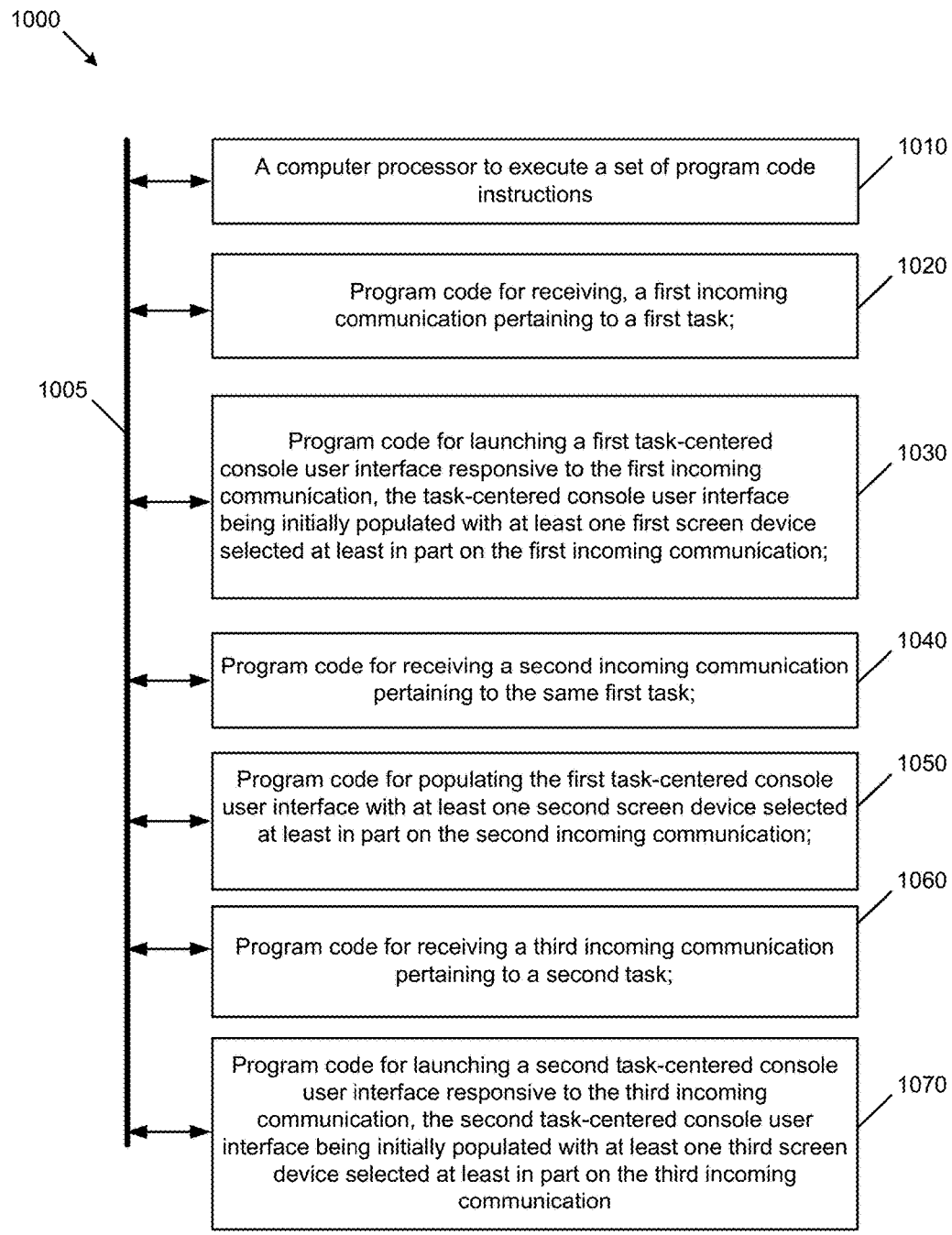
FIG. 10 depicts a block diagram of a system to perform certain functions of a computer system.

FIG. 10 depicts a block diagram of a system to perform certain functions of a computer system. As an option, the present system 1000 may be implemented in the context of the architecture and functionality of the embodiments described herein. Of course, however, the system 1000 or any operation therein may be carried out in any desired environment. As shown, system 1000 comprises at least one processor and at least one memory, the memory serving to store program instructions corresponding to the operations of the system. As shown, an operation can be implemented in whole or in part using program instructions accessible by a module. The modules are connected to a communication path 1005, and any operation can communicate with other operations over communication path 1005. The modules of the system can, individually or in combination, perform method operations within system 1000. Any operations performed within system 1000 may be performed in any order unless as may be specified in the claims. The embodiment of FIG. 10 implements a portion of a computer system, shown as system 1000, comprising a computer processor to execute a set of program code instructions (see module 1010) and modules for accessing memory to hold program code instructions to perform: receiving, a first incoming communication pertaining to a first task (see module 1020); launching a first task-centered context user interface responsive to the first incoming communication, the task-centered context user interface being initially populated with at least one first screen device selected based at least in part on the first incoming communication (see module 1030); receiving a second incoming communication pertaining to the same first task (see module 1040); populating the first task-centered context user interface with at least one second screen device selected based at least in part on the second incoming communication (see module 1050); receiving a third incoming communication pertaining to a second task (see module 1060); launching a second task-centered context user interface responsive to the third incoming communication, the second task-centered context user interface being initially populated with at least one third screen device selected based at least in part on the third incoming communication (see module 1070).

System Architecture Overview

Figure 11:
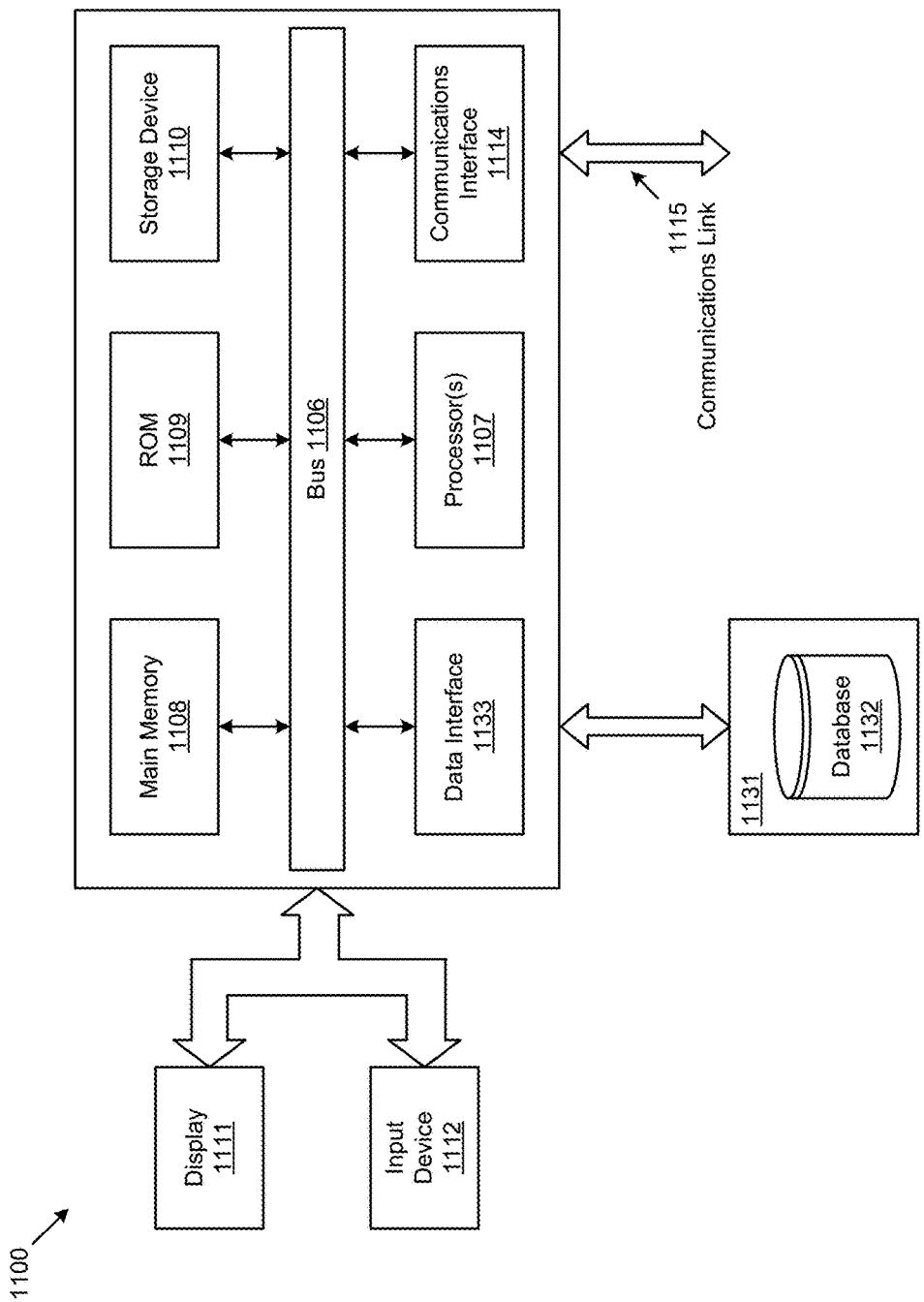
FIG. 11 depicts a block diagram of an instance of a computer system suitable for implementing an embodiment of the present disclosure.

FIG. 11 depicts a block diagram of an instance of a computer system 1100 suitable for implementing an embodiment of the present disclosure. Computer system 1100 includes a bus 1106 or other communication mechanism for communicating information, which interconnects subsystems and devices, such as a processor 1107, a system memory 1108 (e.g., RAM), a static storage device (e.g., ROM 1109), a disk drive 1110 (e.g., magnetic or optical), a data interface 1133, a communication interface 1114 (e.g., modem or Ethernet card), a display 1111 (e.g., CRT or LCD), input devices 1112 (e.g., keyboard, cursor control), and an external data repository 1131.

According to one embodiment of the disclosure, computer system 1100 performs specific operations by processor 1107 executing one or more sequences of one or more instructions contained in system memory 1108. Such instructions may be read into system memory 1108 from another computer readable/usable medium, such as a static storage device or a disk drive 1110. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1100. According to certain embodiments of the disclosure, two or more computer systems 1100 coupled by a communications link 1115 (e.g., LAN, PTSN, or wireless network) may perform the sequence of instructions required to practice the disclosure in coordination with one another.

Computer system 1100 may transmit and receive messages, data, and instructions, including programs (e.g., application code), through communications link 1115 and communication interface 1114. Received program code may be executed by processor 1107 as it is received, and/or stored in disk drive 1110 or other non-volatile storage for later execution. Computer system 1100 may communicate through a data interface 1133 to a database 1132 on an external data repository 1131. A module as used herein can be implemented using any mix of any portions of the system memory 1108, and any extent of hard-wired circuitry including hard-wired circuitry embodied as a processor 1107.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A method for implementing a task-centered interaction management system, the method comprising:
   generating a console comprising a set of contexts corresponding to a live event group or an offline event group, the live event group being populated for live events and the offline event group being populated for offline events;
   launching a user interface (UI) within the console that corresponds to a plurality of communications over a plurality of communication channels, the plurality of communications comprising communications that are simultaneous and concurrent such that a set of live events form a first subgroup within the UI and a set of offline events form a second subgroup within the UI that is different from the first subgroup;
   populating a first portion of space within the UI with a first context that corresponds to a first communication over a first communication channel, the first communication corresponding to communications for live event communications that are grouped together; and
   populating a second portion of space within the UI with a second context that corresponds to a second communication over a second communication channel, the second communication corresponding to communications for offline event communications that are grouped together.

2. The method of claim 1, further comprising,
   merging at least one of the first subgroup or the second subgroup with at least an additional screen device included within a second context into a single window; and
   responsive to switching from a first context to an additional context, where the first context and additional context share an exclusive communication channel, automatically activating a communication in the additional context and pausing one or more communications in the first context, wherein the first communication and the second communication are capable of being switched between the live event and the offline event.

3. The method of claim 1, further comprising:
   determining a first priority of the first context relative to a second priority of a second context, wherein the first priority or second priority are based at least in part on one or more of an urgency of a task corresponding to the first context or the second context or a value placed on a user associated with the first context or the second context.

4. The method of claim 3, further comprising:
placing a first icon corresponding to the first context relative to a second icon corresponding to the second context based at least in part on the first priority relative to the second priority;
placing an icon corresponding to a low-priority context in a drop-down list of icons;
wherein the first context is represented in a global toolbar as an icon or a text block, the global toolbar capable of being collapsed or expanded;
wherein the first context is subsumed within a tool-based UI; and
wherein the first context is launched and managed by a task-centered context manager.

5. The method of claim 1, further comprising:
receiving event indications from within the first context;
populating the first context based at least in part on the event indications;
facilitating display and coordination of activities between the first communication channel and the second communication channel using a channel manager;
characterizing the first context as set of single-channel real-time interactions or as a set of multichannel real-time interactions;
navigating between multiple contexts using a multi-terminal environment having two display surfaces;
deleting the first context responsive to receiving a request to close a tab corresponding to the first context or responsive to termination of all communications within the first context; and
downgrading the first context from a live mode to an offline mode responsive to termination of all live communication channels within the first context.

6. The method of claim 1, further comprising:
receiving a third communication pertaining to a second task; and
launching a second UI responsive to the third communication, the second UI being initially populated with at least one third screen device selected based at least in part on the third communication.

7. The method of claim 1, further comprising:
receiving a request from a user to communicate the first context to an additional user;
sending the request from the user to communicate the first context to the additional user;
receiving, from the additional user, an acceptance of the request or a rejection of the request to communicate the first context to the additional user; and
responsive to receiving the acceptance of the request from the additional user, cloning one or more components of the first context to a console of the additional user.

8. A computer system for task-centered context management, comprising:
a computer processor to execute a set of program code instructions; and
a memory to hold the set of program code instructions, in which the set of program code instructions comprise program code to perform:
generating a console comprising a set of contexts corresponding to a live event group or an offline event group, the live event group being populated for live events and the offline event group being populated for offline events;
launching a user interface (UI) within the console that corresponds to a plurality of communications over a plurality of communication channels, the plurality of communications comprising communications that are simultaneous and concurrent such that a set of live events form a first subgroup within the UI and a set of offline events form a second subgroup within the UI that is different from the first subgroup;
populating a first portion of space within the UI with a first context that corresponds to a first communication over a first communication channel, the first communication corresponding to communications for live event communications that are grouped together; and
populating a second portion of space within the UI with a second context that corresponds to a second communication over a second communication channel, the second communication corresponding to communications for offline event communications that are grouped together.

9. The computer system of claim 8, in which the set of program code instructions comprise program code to further perform:
merging at least one of the first subgroup or the second subgroup with at least an additional screen device included within a second context into a single window; and
responsive to switching from a first context to an additional context, where the first context and additional context share an exclusive communication channel, automatically activating a communication in the additional context and pausing one or more communications in the first context, wherein the first communication and the second communication are capable of being switched between the live event and the offline event.

10. The computer system of claim 8, in which the set of program code instructions comprise program code to further perform:
determining a first priority of the first context relative to a second priority of a second context, wherein the first priority or second priority are based at least in part on one or more of an urgency of a task corresponding to the first context or the second context or a value placed on a user associated with the first context or the second context.

11. The computer system of claim 10, in which the set of program code instructions comprise program code to further perform:
placing a first icon corresponding to the first context relative to a second icon corresponding to the second context based at least in part on the first priority relative to the second priority;
placing an icon corresponding to a low-priority context in a drop-down list of icons;
wherein the first context is represented in a global toolbar as an icon or a text block, the global toolbar capable of being collapsed or expanded;
wherein the first context is subsumed within a tool-based UI; and
wherein the first context is launched and managed by a task-centered context manager.

12. The computer system of claim 8, in which the set of program code instructions comprise program code to further perform:
receiving event indications from within the first context;
populating the first context based at least in part on the event indications;

facilitating display and coordination of activities between the first communication channel and the second communication channel using a channel manager;

characterizing the first context as set of single-channel real-time interactions or as a set of multichannel real-time interactions;

navigating between multiple contexts using a multi-terminal environment having two display surfaces;

deleting the first context responsive to receiving a request to close a tab corresponding to the first context or responsive to termination of all communications within the first context; and downgrading the first context from a live mode to an offline mode responsive to termination of all live communication channels within the first context.

13. The computer system of claim 8, in which the set of program code instructions comprise program code to further perform:

receiving a third communication pertaining to a second task; and launching a second UI responsive to the third communication, the second UI being initially populated with at least one third screen device selected based at least in part on the third communication.

14. The computer system of claim 8, in which the set of program code instructions comprise program code to further perform:

receiving a request from a user to communicate the first context to an additional user;

sending the request from the user to communicate the first context to the additional user;

receiving, from the additional user, an acceptance of the request or a rejection of the request to communicate the first context to the additional user; and responsive to receiving the acceptance of the request from the additional user, cloning one or more components of the first context to a console of the additional user.

15. A computer program product embodied in a non-transitory computer readable medium, the non-transitory computer readable medium having stored thereon a sequence of instructions which, when executed by a processor causes the processor to execute a process to implement task-centered context management, the process comprising:

generating a console comprising a set of contexts corresponding to a live event group or an offline event group, the live event group being populated for live events and the offline event group being populated for offline events;

launching a user interface (UI) within the console that corresponds to a plurality of communications over a plurality of communication channels, the plurality of communications comprising communications that are simultaneous and concurrent such that a set of live events form a first subgroup within the UI and a set of offline events form a second subgroup within the UI that is different from the first subgroup;

populating a first portion of space within the UI with a first context that corresponds to a first communication over a first communication channel, the first communication corresponding to communications for live event communications that are grouped together; and populating a second portion of space within the UI with a second context that corresponds to a second communication over a second communication channel, the second communication corresponding to communications for offline event communications that are grouped together.

16. The computer program product of claim 15, in which the process to implement task-centered context management further comprises:

merging at least one of the first subgroup or the second subgroup with at least an additional screen device included within a second context into a single window; and responsive to switching from a first context to an additional context, where the first context and additional context share an exclusive communication channel, automatically activating a communication in the additional context and pausing one or more communications in the first context, wherein the first communication and the second communication are capable of being switched between the live event and the offline event.

17. The computer program product of claim 15, in which the process to implement task-centered context management further comprises:

determining a first priority of the first context relative to a second priority of a second context; and wherein the first priority or second priority are based at least in part on one or more of an urgency of a task corresponding to the first context or the second context or a value placed on a user associated with the first context or the second context.

18. The computer program product of claim 17, in which the process to implement task-centered context management further comprises:

placing a first icon corresponding to the first context relative to a second icon corresponding to the second context based at least in part on the first priority relative to the second priority;

placing an icon corresponding to a low-priority context in a drop-down list of icons;

wherein the first context is represented in a global toolbar as an icon or a text block, the global toolbar capable of being collapsed or expanded;

wherein the first context is subsumed within a tool-based UI; and wherein the first context is launched and managed by a task-centered context manager.

19. The computer program product of claim 15, in which the process to implement task-centered context management further comprises:

receiving event indications from within the first context;

populating the first context based at least in part on the event indications;

facilitating display and coordination of activities between the first communication channel and the second communication channel using a channel manager;

characterizing the first context as set of single-channel real-time interactions or as a set of multichannel real-time interactions;

navigating between multiple contexts using a multi-terminal environment having two display surfaces;

deleting the first context responsive to receiving a request to close a tab corresponding to the first context or responsive to termination of all communications within the first context; and downgrading the first context from a live mode to an offline mode responsive to termination of all live communication channels within the first context.

20. The computer program product of claim 15, in which the process to implement task-centered context management further comprises:

receiving a third communication pertaining to a second task; and launching a second UI responsive to the third communication, the second UI being initially populated with at least one third screen device selected based at least in part on the third communication.

21. The computer program product of claim 15, in which the process to implement task-centered context management further comprises:

receiving a request from a user to communicate the first context to an additional user;

sending the request from the user to communicate the first context to the additional user;

receiving, from the additional user, an acceptance of the request or a rejection of the request to communicate the first context to the additional user; and responsive to receiving the acceptance of the request from the additional user, cloning one or more components of the first context to a console of the additional user.

* * * * *

UNITED STATES PATENT AND TRADEMARK OFFICE
CERTIFICATE OF CORRECTION

PATENT NO. : 10,332,047 B2
APPLICATION NO. : 15/333128
DATED : June 25, 2019
INVENTOR(S) : Wu et al.

Page 1 of 1

It is certified that error appears in the above-identified patent and that said Letters Patent is hereby corrected as shown below:

In the Specification

In Column 7, Line 29, after "UI" insert -- . --.

In Column 14, Line 15, delete "ools." and insert -- tools. --, therefor.

In Column 15, Line 60, delete "PTSN," and insert -- PSTN, --, therefor.

Signed and Sealed this
Twenty-first Day of July, 2020

Andrei Iancu
*Director of the United States Patent and Trademark Office*